US005665232A

United States Patent [19]

Schlegel

[11] Patent Number: 5,665,232

[45] Date of Patent: Sep. 9, 1997

[54] APPARATUS FOR SEPARATING OFF THE LIQUID PORTION FROM THE SOLIDS PORTION OF TWO-PHASE SYSTEMS

[76] Inventor: Dietrich Schlegel, Schlackstrasse 3, D-52080 Aachen, Germany

[21] Appl. No.: 516,778

[22] Filed: Aug. 18, 1995

[51] Int. Cl.[6] .............................. B30B 9/14; B01D 29/35; B01D 39/20

[52] U.S. Cl. .......................... 210/408; 210/411; 210/413; 210/414; 210/415; 210/510.1; 100/117; 100/126; 100/145

[58] Field of Search .................................... 210/408, 405, 210/413, 414, 415, 510.1, 333.1, 323.2, 411; 100/117, 145, 126

[56] References Cited

U.S. PATENT DOCUMENTS 4,150,617 4/1979 Schramm .
4,155,299 5/1979 Tuttle .
4,397,230 8/1983 Hunt .
4,624,786 11/1986 Schlegel .

FOREIGN PATENT DOCUMENTS 55-051000 4/1980 Japan .
2-26604 1/1990 Japan .

OTHER PUBLICATIONS

European Search Report for Patent No. 95 10 6675.

*Primary Examiner*—Thomas M. Lithgow
*Attorney, Agent, or Firm*—Price, Heneveld, Cooper, DeWitt & Litton

[57] ABSTRACT

In an apparatus for separating off the liquid portion from the solid portion of two-phase systems, in particular ceramic slips, having a screw and having filter surrounding the screw, a two-stage construction of the apparatus is realized by a first filter and a second filter section.

20 Claims, 6 Drawing Sheets

APPARATUS FOR SEPARATING OFF THE LIQUID PORTION FROM THE SOLIDS PORTION OF TWO-PHASE SYSTEMS

The invention relates to an apparatus for separating off the liquid portion from the solids portion of finely disperse mineral slurries, in particular a ceramic slip, having a screw and having cylindrical filter means which surround the screw at a radial distance and are arranged along the screw and which together with the screw delimit a transport channel for the slip which is fed via a material feed at one end of the filter screw press and after being transported through the channels of the rotating screw is removed at the other end as solid discharge via a mouthpiece, the liquid portion flowing through the filter means being removed via a filtrate take-off.

An apparatus according to the preamble of patent claim 1 is already known (EP-B 0 138 920) in which the filter means surrounding the screw are arranged in a housing. The filter means surfaces facing the screw, of the filter means incorporated in the housing are covered with an abrasion-resistant protective grating to protect against abrasion. In the meshes of this grating there forms a stationary filter cake which represents a significant resistance to flow for the filtrate efflux. This resistance is the smaller, the smaller is the thickness of the grating and the smaller is the area fraction of the filter means surface covered by the grating rods. For reasons of strength and stability, but also to fulfil the protective function, the thickness of the grating and the area fraction covered by the grating cannot be decreased to any desired value, so that limits are set for reduction of the resistance to the filtrate efflux. Apart from the disadvantageous flow resistance to the filtrate efflux caused by the protective grating, owing to the use of the protective grating, a constructional expenditure of such a known filter screw press also results, however.

The object of the invention is to eliminate the disadvantage of the prior art, in particular to create an apparatus for separating off the liquid portion from the solids portion which is structurally simply made up and which succeeds without the requirement for additional protective gratings for the filter means.

This object is achieved according to the invention by the features contained in the characterizing part of claim 1, expedient developments of the invention being characterized by the features contained in the subclaims.

The invention starts from the knowledge that from the beginning to beyond the middle of the screw channel, the two-phase system is still liquid to soft plastic, so that a filter cake resting on the filter means forms in the gap between the outer diameter of the screw and the inner diameter of the filter cylinder, the solids content of which filter cake is higher than that of the medium in the screw channel, so that because of the resting filter cake, the filter means are protected against friction. For this reason, in this section the use of filter media is sufficient which do not need to be designed for high abrasion resistance, or additional protective measures for the filter means by upstream provision of protective gratings and the like can be dispensed with. This is taken into account by the invention by the two-stage construction of the apparatus, where in the first filter means section, filter means having a low resistance to abrasion can be used, in contrast, in the second filter means section following thereon filter means are used which are distinguished by a higher resistance to abrasion. For this purpose, in particular porous silicon carbide cylinders or silicon nitride cylinders are suitable. In this case it is expedient that the filter means are incorporated into filter elements having restricted axial length, which elements are advantageously fabricated to be structurally identical. This offers the possibility of combining the filter elements in a modular manner, by filter elements of the first filter means section and filter elements of the second filter means section being adjacently arranged along the screw axis. The filter elements in this case are sealed from each other by conventional seals.

The filter means of the first filter section are distinguished by very fine pores close to the filter means surface, the pore system expanding into the filter means. By this means, fine particles are substantially retained on the filter means surface, whereas very fine particles passing into the pore system can pass through the filter means without further problems. By this means blockages are substantially avoided.

In the case of finely disperse mineral slurries, in particular in the case of ceramic slip, in the first filter section a stationary filter cake layer adheres to the surface of the filter medium in such a manner that abrasion and primary blockage of the filter medium are thereby kept away. In zone 2, that is the second filter section, the two-phase system is already concentrated to form a disperse plastic material. Here, in the entire screw channel, there is direct contact of the disperse solids particles with each other. The solids particles are apparently so strongly fixed here in a solids framework that penetration of very fine solids particles into the filter medium does not proceed even if the protecting stationary cake layer no longer exists here. Because of this fact, the protective gratings on the filter media originally provided in accordance with EP-B 0 138 920 can be dispensed with, which protective gratings would greatly increase the resistance to the efflux of the filtrate and by this means would greatly decrease the throughput. At the same time, a considerable cost reduction in construction results. Relatively cheap filter elements sensitive to abrasion can be used for the first filter section, whereas only in the second filter section are abrasion elements required which are correspondingly more resistant to abrasion.

This is highly essential for the economic and thus practical success of the apparatus.

Fine-pore sinter screen fabrics and porous silicon carbide are examples of the filter media required in the respective sections. Obviously, however, other suitable filter media can also be used.

Particularly advantageous is the subdivision according to the invention of the filtering screw cylinder into a number of self-supporting elements having correspondingly smaller axial extent of the filter elements in which the filter media are firmly fixed in undivided steel cylinders, by which means the very high forces arising in the processing can easily be absorbed. A closed housing which incorporates the filter elements is unnecessary in this case, rather a frame is sufficient which fixes the position of the filter elements and absorbs the torques which act on the individual filter elements.

Expediently, the filter elements are constructed so as to be self-supporting, the filter means either being welded into a solid steel cylinder or a steel cylinder being shrunk over the filter means, which is the case especially when ceramic filter media are used. Owing to the self-supporting property of the filter elements, the requirement for an additional housing is dispensed with. The filter elements, after being arranged in sequence, are fixed merely by tie bolts and additionally secured against rotation externally by a frame. This gives an overall very simple, easy to assemble construction of a filter screw press.

Finally, a special wash process is also further essential, in order to clean both the screw channel and also the filter elements after relatively long operating times. For this purpose, in a first operating cycle, the screw channels are washed by tap water, whereas in a second operating cycle, the filter elements are rinsed with alternating direction of flow, actually preferably individually, with pressurized wash water. It is also possible, without previous washing of the screw channels, to rinse only the pore system of the filter elements with wash water in pulses against the direction of flow of the filtrate.

BRIEF DESCRIPTION OF THE DRAWINGS

A preferred illustrative example of the invention is described below on the basis of the drawing. In the drawings

Figure 1:
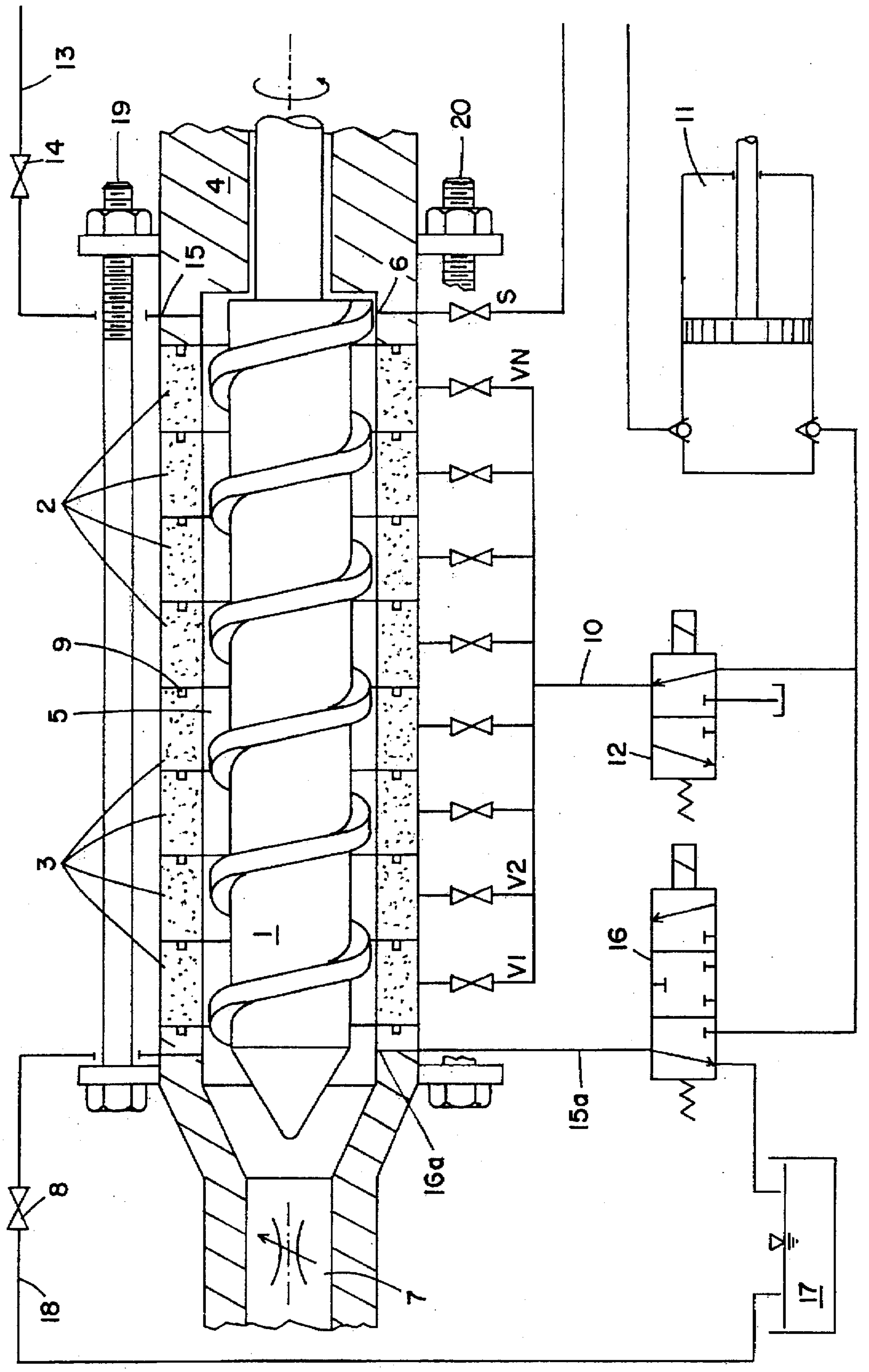
FIG. 1 shows a diagrammatic sectional view of the apparatus through the longitudinal axis.

The apparatus according to FIG. 1 is formed by a filter screw press which has a conventional screw 1 which is arranged inside a housing formed by adjacently arranged filter elements 2 and 3 and is mounted at 4 so as to be able to rotate. The screw I which is set in rotation by a drive which is not illustrated serves for conveying ceramic slip which is transported for the purpose of separating off the liquid portion from the solids portion through the screw channel formed between the screw 1 and the filter elements 2 and 3. The slip is fed to the screw channel 5 via the material feed 6 at one end of the filter screw press and leaves the press at the other end via the mouthpiece 7. At 8 a removal port is shown which serves as a bypass and is described in further detail below. The filter elements 2 of the first filter medium section extend over at least half of the part of the screw active for slip conveyance. In the illustrative example shown, four filter elements 2 are shown in this case which are followed by three filter elements of the second filter means section. The cylindrically constructed filter elements 2 and 3 adjacently arranged along the screw axis are sealed side by side by seals 9 of conventional type. The filter elements 2 and 3 are constructed so as to be self-supporting, so that an additional housing for the filter screw press is dispensed with.

Finally, the filter screw press includes a wash water feed line 10 via which, via a water pump 11 and a control valve 12, wash water can be fed to the individual filter elements with intermediate connection of valves $V_1$ to $V_n$. A further wash water circuit is formed by the water line 13 and the valve 14, which water line opens out at 15 into the filter screw press, and by the wash water line 15*a* and the control valve 16, the line 15*a* leading off the wash water from the screw channel at the mouthpiece-side end at 16*a*. 17 denotes a sedimentation tank for the wash water, a line 18 also opening out into the tank 17, which line leads off from the bypass 8. Finally, tie bolts are shown diagrammatically in FIG. 1 by 19 and 20 which serve to fix the filter elements 2 and 3.

Figure 2:
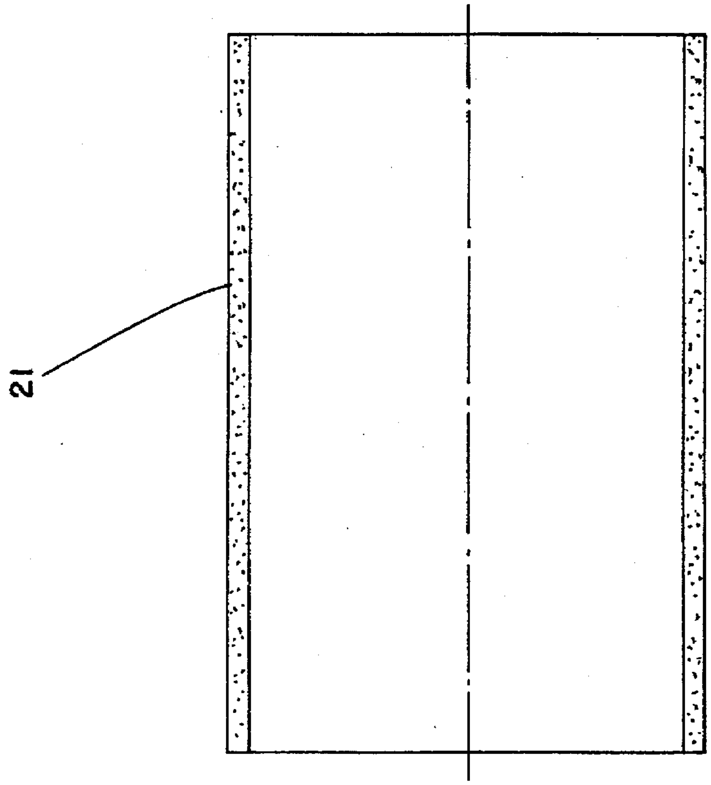
Figure 4:
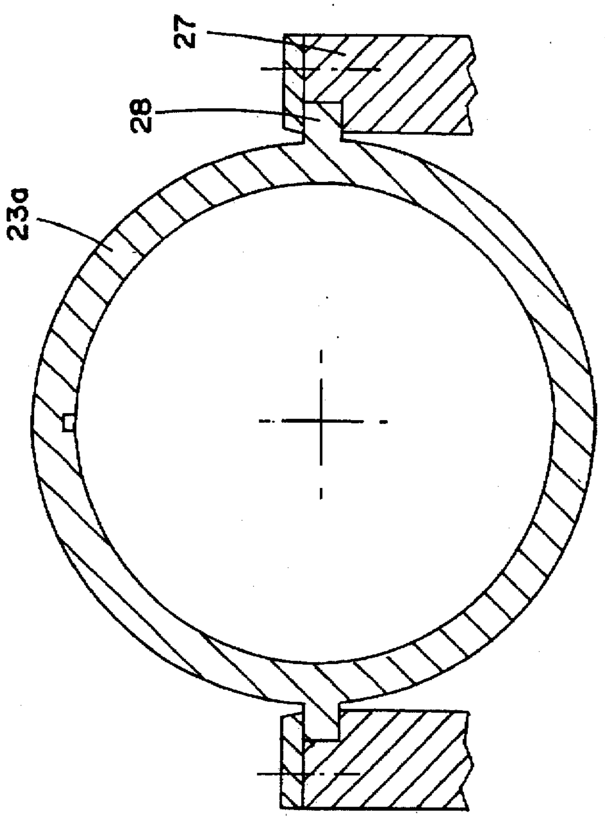

FIGS. 2 to 5 show the construction of the filter elements 2 of the first filter means section. Here, FIG. 2 shows the filter means 21 of the first filter means section, which is preferably formed of a plurality of layers of screen cloths arranged one above the other which are sintered together. This gives the porous system of the filter means 21 which is, moreover, constructed to be circularly cylindrical. Instead of a screen cloth sintered together, the filter means can also be formed from a porous sintered metal cylinder, in particular sintered steel.

The porous cylindrical filter means 22 of the second filter means section (FIG. 6) are formed from ceramic material, in particular silicon carbide or silicon nitride.

Figure 3:
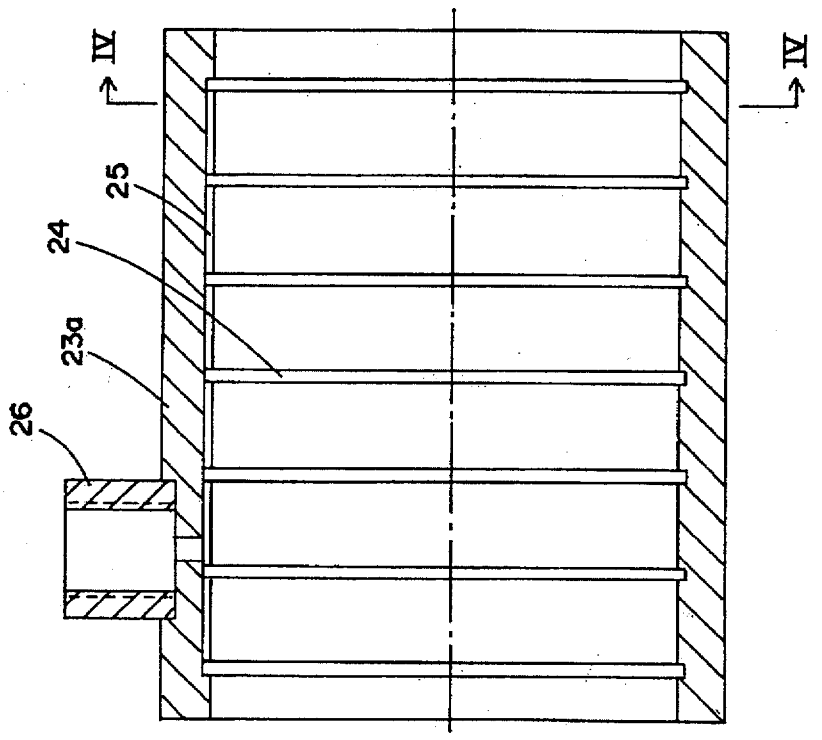
Figure 7:
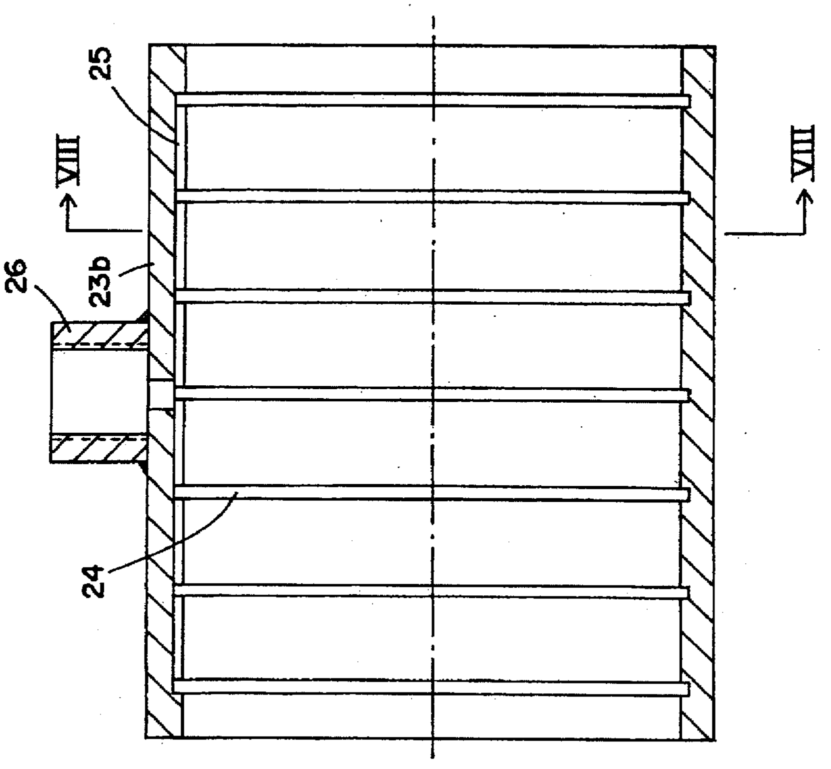

The sintered screen cloths or sintered steel cylinders for the first filter means section and the silicon carbide cylinders or silicon nitride cylinders for the second filter means section are each incorporated in a solid steel cylinder 23*a* or 23*b* which is shown in FIGS. 3 and 7.

According to FIG. 3, channels 24 running at a distance of about 20 mm in the peripheral direction are arranged in the interior of the steel cylinder 23 which are connected together by one or more axially running channels 25 which pass the filtrate to outlet bore holes 26 in the steel cylinder 23*a*. Correspondingly, peripheral channels 24 are also provided in the steel cylinder 23*b* to receive the filter means 22 of the second filter means section, which peripheral channels are connected by longitudinally running channels 25 in order to remove the filtrate via the outlet bore hole 26.

Figure 5:
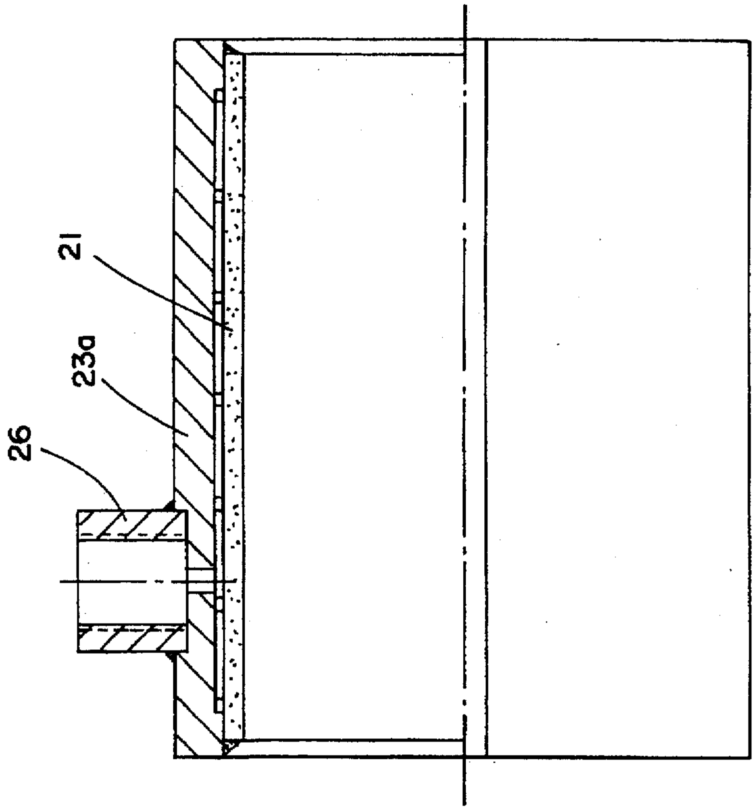
FIGS. 2 to 5 show details of a filter element of the first section of the apparatus and FIGS. 6 to 9 show corresponding detail representations of a filter element of the second section of the apparatus.
Figure 9:
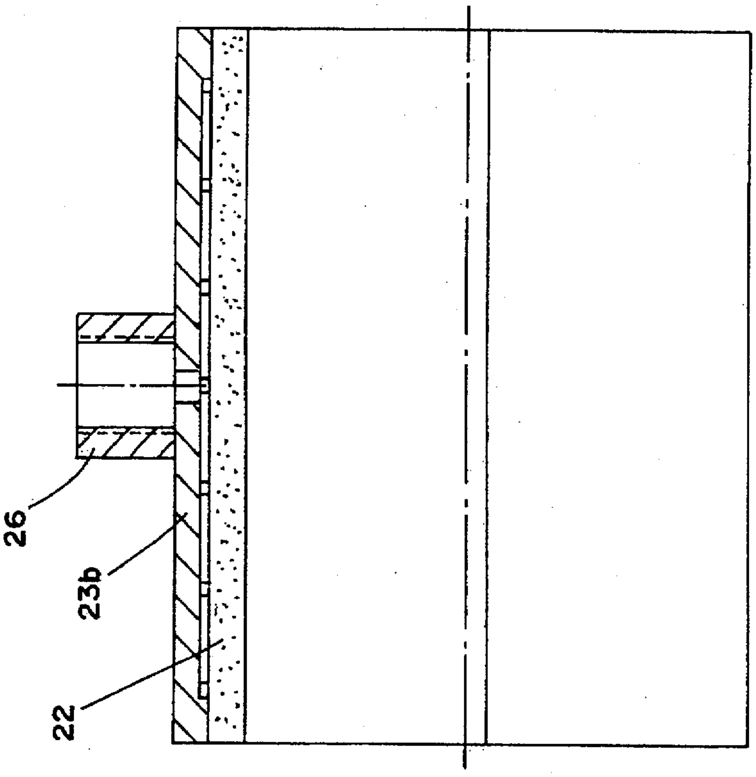
Figure 6:
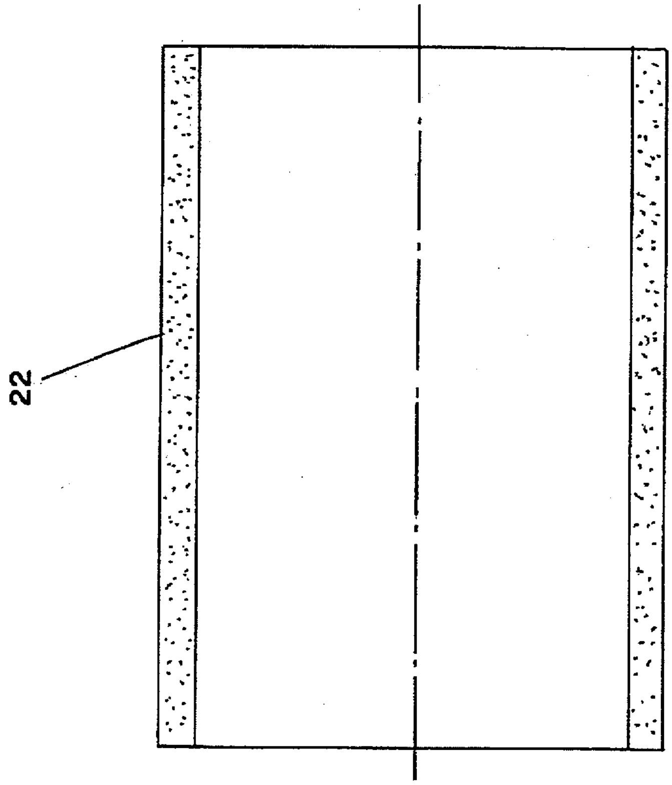
Figure 8:
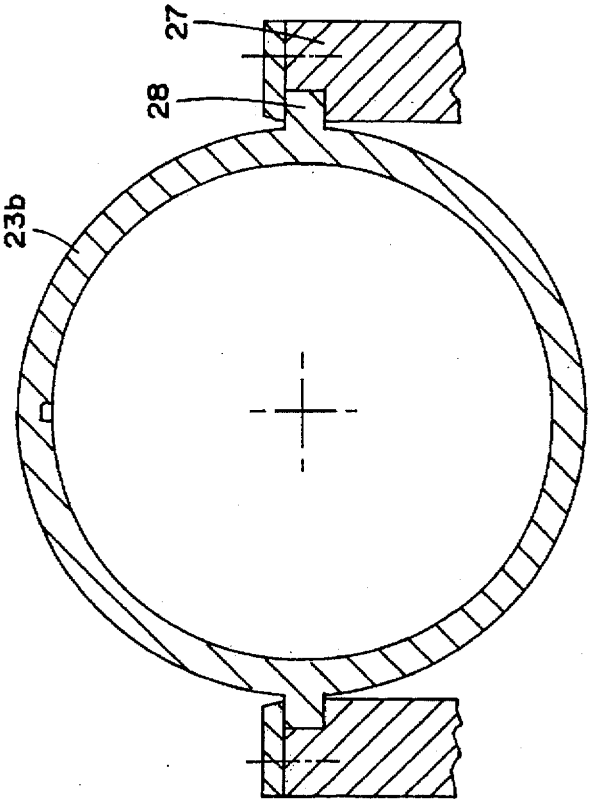

The sintered screen cloths or sintered steel cylinders are welded into the steel cylinder 23*a*, as follows from FIG. 5. The silicon carbide cylinders or silicon nitride cylinders according to FIG. 6 are ground to an exact dimension to form the filter element, so that the steel cylinder 23*b* can be shrunk on thermally. The combined filter element is shown in FIG. 9 in this case.

In the filter element according to the FIGS. 6 to 9, the measurement tolerances must be chosen so that after cooling of the steel cylinder and at a filtration pressure of 120 bar in the screw channel, the cylindrical filter medium (silicon carbide or silicon nitride) is unstressed in the center in the peripheral direction. If the pressure in the screw channel or in the filter element assumes the value zero, the cylindrical filter medium is placed under high pressure in the peripheral direction owing to the shrunk-on steel jacket. The wall thickness of the cylindrical filter medium must be chosen in this case in such a way that the silicon carbide material or silicon nitride material is not overstressed. Since the said materials can absorb high compressive stresses but only low tensile stresses, filter elements which absorb high filtration pressures may only be successfully prepared from these materials in the way described. In this case, in particular, the cylindrical fabrication of the steel cylinders is as full jackets, since when half-shells are used, sufficiently uniform pressure loading on the periphery of the cylindrical filter element cannot be ensured. This could lead to rupturing of the filter elements.

The filter elements 2 and 3, as are shown in FIGS. 2 to 5 and 6 to 9, are fabricated so as to be self-supporting and do not need to be supported from the exterior by a special housing. They are merely arranged on a corresponding frame which is denoted by 27 in FIGS. 4 and 8. This frame 27 has a recess 28 in which a continuation of the steel cylinder engages, by which means the frame 27 absorbs the torque applied internally to the filter means surface by the rotating screw.

The filter elements have restricted axial lengths, in the preferred embodiment the length of the filter elements being in the range from 100 to 200 mm. The division of the filter medium into individual filter elements not only gives a modular system, but the filter media of screen cloths and of sintered steel can be correspondingly welded to the surrounding steel jackets. In addition, problem-free thermal shrink-fitting of the steel jackets onto the filter means of silicon carbide and silicon nitride is thereby ensured. This construction of the screw cylinder of individual filter elements 2 and 3 also proves useful in the sought-after washing of the filter elements in sections which is further described below.

From the entry of the slip at 6 into the screw channel 5 up to beyond the center of the screw channel (up to approximately 60 percent by weight dry matter), the two-phase system in the screw channel is still liquid to soft plastic. In this region are arranged the filter elements 2. The screw is not yet active in conveyance (slightly falling pressure in this zone). In the gap between outer diameter of the screw and inner diameter of the filter cylinder a filter cake resting on the filter cylinder is formed which has a markedly higher solids content than that of the medium in the screw channel. This filter cake therefore also has a markedly higher mechanical strength than the material in the screw channel. This resting filter cake layer is highly essential in the first section since it keeps the friction from the filter means. This applies when a defined layer thickness is not undershot, which is about 0.5 to 1 mm the basis of test results. The resistance to the filtrate efflux in this first filter means section is essentially in this resting filter cake layer, since in the screw channel, for reasons which are not to be considered in detail here, there is still virtually no direct contact between the solids particles (solids framework pressure 0). The resistance to the filtrate efflux cannot be decreased to any desired value, since a minimum thickness of the static filter cake layer cannot be undershot. However, it is in any event smaller without the use of a protective grating, which is superfluous in the first filter means section, than with a protective grating. In this zone a few layers of fine-meshed screen cloths which were sintered together or porous sintered steel cylinders are sufficient as filter means, since here there is no hazard to the filter means due to abrasion.

Expediently, in the case of the filter means made of screen cloths sintered together or sintered steel, pore structures are realized in a known manner, the finest pores being situated close to the filter means surface where the filter cake forms. From there, the pore system expands into the respective filter medium. Fine particles are substantially retained by this means on the filter means surface. Very fine particles which penetrate into the filter means will highly probably pass completely through the expanding channels of the filter medium and will exit together with the filtrate. The possibility of blockages is thus considerably decreased.

In the second filter means section immediately following the first, the solids concentration in the screw channel, at over 60 percent by weight, has increased to the point that a marked differentiation between the medium in the screw channel and filter cake layer on the filter means is no longer possible. The screw is markedly active in conveyance. The dewatering takes place here essentially by compression of the disperse plastic medium in the screw channel, the solids particles already directly contacting each other. To avoid abrasion, a filter medium made of highly abrasion resistant silicon carbide or silicon nitride must be used, a protective grating not being necessary, however. The very rough surface structure of the silicon carbide further partially prevents the slippage along the wall, but at very high solids concentrations, wall slippage processes can no longer be completely excluded.

In the course of a relatively long operating time, as occurs in practice, the filtrate flow rate gradually decreases which is due to blockage processes. The fine pores of the filter means and especially of the stationary cake layer on the filter means are gradually plugged in the course of a relatively long operating time by the very fine solids particles also present in the screw channel in the two-phase system, so that the resistance to flow to the filtrate stream increases. However, this blockage can be reversed by a wash process. In this case, the washing proceeds in two steps, that is at the end of a relatively long stationary operation of the filter screw press.

For the purpose of washing, the mouthpiece 7 or of the bypass 8 is opened for the efflux of the plastic material at the mouthpiece-side end of the screw channel, in order to reduce greatly the resistance to flow for the outflow of the plastic material from the screw channel. The screw rotates further and the slip feed is also maintained via the material feed 6. The rotating screw is thus able, owing to its conveying action, to substantially transport the plastic material away from the screw channel, which proceeds until slip breaks through from the material feed 6 to the outlet at the mouthpiece 7 or bypass 8. The slip feed 6 is then shut off and the water line cock 14 is opened, so that water is fed into the filter screw press. The water then flows through the screw channels and then, in place of slip, leaves the housing of the filter screw press via the mouthpiece 7 or the bypass 8. By this means an effective washing of the screw channel is performed which is substantially purified of slip and plastic material. The rotary motion of the screw reinforces the wash process in this case. The wash process is ended when slip and residues of plastic material have been washed out of the screw channel.

Expediently, washing of the filter elements then follows. For this purpose, the connection to the water grid at 14 and the outflow orifices 7 and 8 are closed. Wash water is then passed under high pressure through the pore system of the filter means in alternating direction of flow via automatically controlled valves 12 and 16. The change in the direction is controlled in a predetermined time cycle by the solenoid valves 12 and 16. The wash water stream for the filter means is conveyed by a, for example, hydraulically driven piston pump 11. The feed pressure can then be hydraulically controlled in a simple manner (10 to 30 bar). The wash water stream, if washing were carried out with a constant flow direction, would decrease after a short time since the fine particles which block the pore system and are initially detached from their positions by the wash water stream, after a short path, collect again in some corners of the pore system and lead to new blockages. This is avoided by repeated reversal of direction of the wash water stream which transports the fine particles out of highly labyrinthine pore systems, which applies especially in the case of filter means made of porous ceramics.

Expediently, in addition, only a restricted section of the filtering screw cylinder is always washed, in order to avoid the wash water stream flowing over screw cylinder sections already washed clear, while other still blocked sections remain unwashed. Therefore, the individual filter elements 2 and 3 are each washed separately. This is effected by successively opening only one of the valves $V_1$ to $V_n$ at a time.

This filter element washing operation is interrupted several times by washing the screw channel with mains water, as was described previously, in order to convey out of the screw channel residues of the disperse plastic material which have already detached from the surface of the filter means.

In special cases a simplified wash process has also proved useful, which can be used during the running operation of the screw press without previous washing of the screw channels. Wash water is passed through the pore system of the filter elements in counter-current to the filtrate stream at a higher pressure than that present in the screw channel. The wash water stream must be turned on each time repeatedly for a restricted time period. As soon as the wash water stream is turned off for the following time period, because of the high pressure in the screw channel, some of the wash water which has entered into the screw channel, because of the high pressure in the screw channel, flows back through the pore system of the filter medium in the direction of the filtrate stream, so that washing with alternating flow direction likewise results. In this case also, it is expedient to wash each of the filter elements separately successively.

It is particularly advantageous that the cycle times for the wash operations are chosen to be different lengths in the different directions. This means that a particle in the direction of the longer cycle time covers on statistical average a greater path length than in the counter direction and thus has a chance of being transported out of the interior of the filter medium. This procedure succeeds in eliminating a gradual blockage of the filter elements by very fine particles occurring in relatively long operating times.

Figure 10:
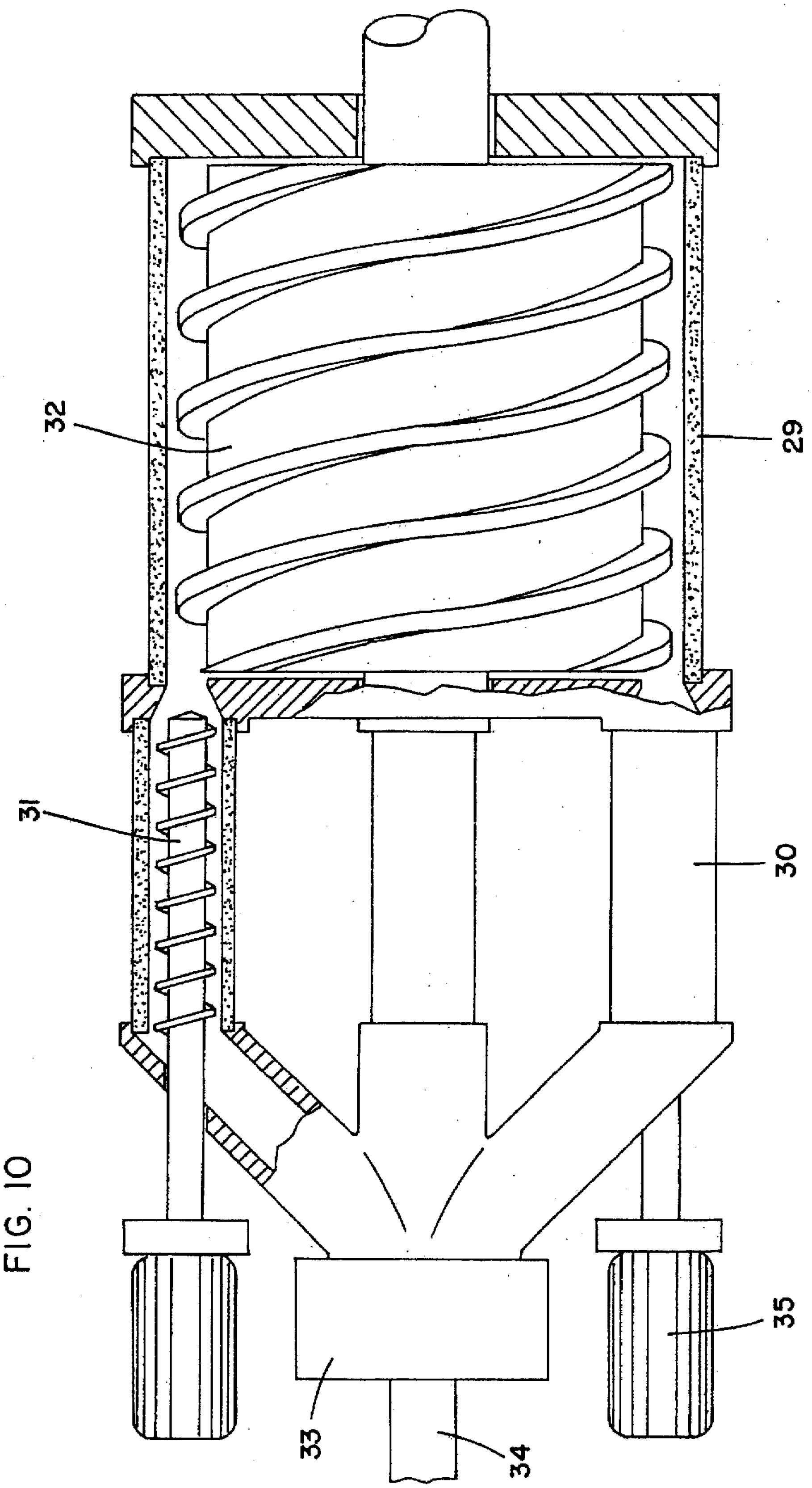
FIG. 10 shows a diagrammatic view of an alternative embodiment of the apparatus.

The formation of individual filter elements together with the subdivision of the filtering screw cylinder into two sections having different filter media are useful, in particular, when the apparatus is to be designed for relatively high throughput. Narrow limits, for hydrodynamic reasons, are set to the increase of the transport velocity of the multiphase system in the screw channel and to the flow velocity of the liquid phase in the pore system which is formed by the disperse solid phase. An increase in throughput of the apparatus by elongation of the axial extent of the screw and by increasing the screw channel depth is therefore possible only to a very restricted extent. Essentially, the throughput can only be achieved by increasing the diameter. Filter elements having screen cloths for the first filter section can be produced with relatively high diameter without relatively great fabrication problems and with reasonable expenditure. Filter elements having porous ceramics, in contrast, can be increased in diameter only to a restricted extent. Already at diameters of 400 mm, fabrication problems arise in machining by grinding which can virtually no longer be overcome and thus correspondingly high costs arise. To increase the throughput, according to the invention for this section, the use of a plurality of filter screws in parallel to each other is proposed. Such an embodiment is shown in FIG. 10. In this case, a filter screw having large diameter forms the first filter section 29. In contrast, the second filter section 30 is formed by a plurality of filter screws operating in parallel and having a smaller diameter than the first filter section 29. In the embodiment according to FIG. 10, four filter screws 31 operating in parallel are provided. In this case the diameter of the filter screws 31 of the second filter section 30 is expediently one quarter of the diameter of the filter screw 32 of the first filter section 29. The filter screws 31 feed the extrudate into a shared mouthpiece 33 from which there exists only an extrudate 34 of plastic mass. The cross-sectional orifice of the mouthpiece 33 is controlled in a known manner in such a way that upstream of the mouthpiece a pressure preset as a constant prevails. The shared speed of rotation of the screws of the second filter section 30 is matched to the speed of rotation of the screw 32 of the first section in such a way that on transition from section 29 to section 30 the concentration in the two-phase system which makes the change of the filter medium necessary is established. Finally, in FIG. 10, drive units of the individual filter screws 31 are denoted by 35.

I claim:

1. An apparatus for separating off the liquid portion from the solids portion of finely dispersed mineral slurries, in particular a ceramic slip, comprising:

a screw and a cylindrical filter means surrounding said screw and arranged along an axis of said screw, and which together with said screw delimit a transport channel through which the ceramic slip is fed to said screw via a material feed at one end of the apparatus and after being transported by said screw is removed at an opposite end as solids via a discharge, the liquid portion flowing through said cylindrical filter means being removed via channels leading to a filtrate take-off, said cylindrical filter means having a two-stage construction including a first filter means section formed from a plurality of screens sintered together or from a porous sintered metal for building up a resting filter cake layer on said cylindrical filter means having a significantly higher solids content than the slip conveyed in said transport channel which extends from said material feed along said screw axis and having a second filter means section which is made up of filter means formed from porous ceramic material, having a higher resistance to abrasion than said filter means of said first filter means section.

2. An apparatus for separating liquids and solids from a finely dispersed mineral slurry, comprising:

a screw;

a cylindrical filter surrounding said screw and arranged along an axis of said screw to delimit a screw channel having a material feed at one end and a discharge at an opposite end, said cylindrical filter having a two-stage construction for building up a resting filter cake layer having a higher solids content than the mineral slurry conveyed in said screw channel, including a first filter section having a first filter means formed from a plurality of layers of screen sintered together or a porous sintered metal, and a second filter section having a second filter means formed from a porous ceramic material and having a higher resistance to abrasion than said first filter means.

3. An apparatus for separating liquids and solids from mineral slurries, comprising in combination:

a filter having an axial passage extending therethrough defining a material feed at one end and a discharge at an opposite end;

first and second cylindrical filter sections tandemly arranged within said axial passage between said material feed and said discharge for building up a resting filter cake layer having a solid content greater than the mineral slurry, said first filter section including a filter formed from a plurality of screens sintered together, or a porous sintered metal, and said second filter section including a filter formed from a porous ceramic material having a resistance to abrasion greater than said first filter; and a screw disposed within said axial passage and through said cylindrical filter sections for moving the mineral slurries from said material feed, along said cylindrical filter section, and out said discharge, the liquid in the mineral slurries being removed through said resting filter cake layer and through said cylindrical filter section via channels within the apparatus leading to a filtrate take-off.

4. The apparatus according to claim 1, wherein said first filter means section extends from said material feed to at least about the middle of said screw, preferably over a region in which the solids content of the slip is 42 to 60 percent by weight, preferably up to at most 60 percent by weight.

5. The apparatus according to claim 4, wherein said filter means sections are each made up of adjacently arranged self-supporting filter elements each formed from a solid steel cylinder having said cylindrical filter means incorporated therein.

6. The apparatus according to claim 5, wherein said filter means of said first filter means section are welded in said steel cylinder and said filter elements of said second filter means section are formed by thermal shrink-fitting of said steel cylinder onto said filter means.

7. The apparatus according to claim 6, wherein said filter elements of said second filter means section, the tolerances of the measurements are chosen so that after said steel cylinder has cooled and at a filtration pressure of about 120 bar in said transport channel, said cylindrical filter means is stress-free in the center in the peripheral direction.

8. The apparatus according to claim 7, wherein said filter elements have an axial extent in the range from 100 to 200 mm.

9. The apparatus according to claim 8, wherein each one of said filter element channels are formed between said steel cylinder and said filter means incorporated therein.

10. The apparatus according to claim 9, wherein said channels of said filter element are formed by channels running in a peripheral direction preferably at a spacing of about 20 mm connected by one or more axially running channels leading to one or more outlet bore holes in said steel cylinder.

11. The apparatus according to claim 10, wherein said filter elements are secured against rotation on a frame arranged along said screw axis.

12. The apparatus according to claim 11, further including surrounding seals arranged between adjacent cylindrical filter elements.

13. The apparatus according to claim 12, further including a wash system wherein in a first operating cycle said screw channels are washed, and in a second operating cycle said filter elements are washed.

14. The apparatus according to claim 13, wherein said screw channels are washed by said discharge or a bypass arranged at a discharge-side end of said screw being open, preferably with said screw rotating and continued slip input via said material feed, until slip breaks through from the inlet to the outlet at the discharge or bypass, then the slip feed being shut off and water being fed into the apparatus at the material-feed-side end.

15. The apparatus according to claim 14, wherein said filter elements are washed after washing said transport channel, by passing pressurized water through the pore system of said filter elements in alternating direction of flow under valve control with the discharge, bypass and slip feed closed.

16. The apparatus according to claim 12, further including a wash system, wherein during running operation of the filter screw press, without prior washing of said transport channel, wash water is passed through the pore system of said filter elements in counter-direction to the filtrate stream by a wash water pump via a valve at a higher pressure than that prevailing in said transport channel, said valve being controlled according to a presettable time cycle in such a way that during a wash process a time period in which the wash water stream is pumped through said filter elements in the opposite direction to the filtrate stream is followed by a time period in which a free filtrate outflow from said filter elements is established so that owing to the high internal pressure in the two-phase system in said transport channel, a liquid stream proceeds through said filter elements in the direction of the filtrate system.

17. The apparatus according to claim 16, wherein said wash process is reinforced by rotation of said screw.

18. The apparatus according to claim 17, wherein said filter elements are each successively washed separately.

19. The apparatus according to claim 18, wherein the washing of said filter elements is interrupted several times by a washing of said transport channel.

20. The apparatus according to claim 19, wherein a plurality of filter screws operating in parallel are provided in the second filter section.

* * * * *